(No Model.)
W. H. OSMER.
PAD FASTENING.
No. 393,783. Patented Dec. 4, 1888.
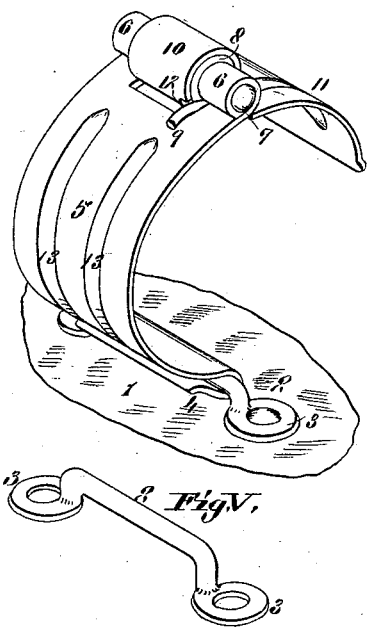
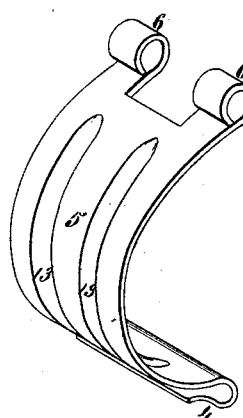
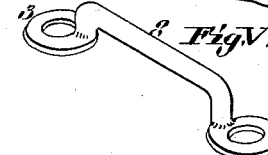
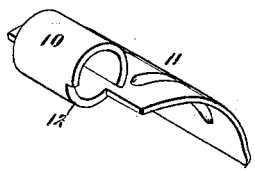
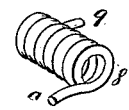
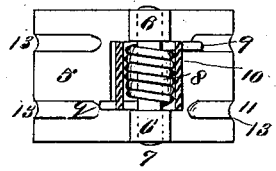
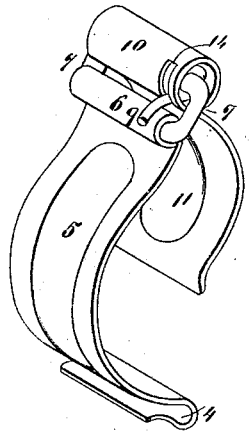
Attest:
Charles Pickles,
G. M. Hinchman Jr.
Inventor:
Wm H. Osmer.

UNITED STATES PATENT OFFICE.

WILLIAM H. OSMER, OF ST. LOUIS, MISSOURI, ASSIGNOR TO THE BURKART-OSMER PAD MANUFACTURING COMPANY, OF SAME PLACE.

PAD-FASTENING.

SPECIFICATION forming part of Letters Patent No. 393,783, dated December 4, 1888.

Application filed August 13, 1888. Serial No. 282,521. (No model.)

*To all whom it may concern:*

Be it known that I, WILLIAM H. OSMER, a citizen of the United States, residing at St. Louis, in the State of Missouri, have invented certain new and useful Improvements in Horse-Collar Pads, of which the following is a specification.

My present invention relates to an improved hook or fastening for adjustably attaching pads to horse-collars; and the objects of my invention are, first, to re-enforce or strengthen the hook by longitudinally corrugating its jointed parts; second, to provide a housing or cylinder for the compression-spring which actuates said jointed parts, and, third, to provide means for governing the expansion of the jointed parts, all of which will be hereinafter more fully described, and then specifically pointed out in the claim.

In the accompanying drawings, Figure I is a perspective view of my improved collar-pad hook, showing it as secured to a horse-collar pad. Fig. II is a perspective view of the shank of the hook. Fig. III is a perspective view of the clamp of the hook provided with a spring-retaining cylinder. Fig. IV is a perspective view of a coil compression-spring. Fig. V is a perspective view of the clip or fastening device by which the hook is secured to the collar-pad. Fig. VI is a top view of the joint of the hook, showing the spring-retaining cylinder in section. Fig. VII is a modification of my improved hook. Fig. VIII is a view in section of the hook made with a double corrugation. Fig. IX is a view in section of plain flat hook material. Fig. X is a view in section of the hook made with a single longitudinal corrugation.

Similar figures indicate similar parts throughout the several views.

1 represents the surface of a horse-collar pad to which is riveted the clip 2 through the eye 3. 4 shows the end of the shank 5 folded around the clip 2, thus pivotally securing the hook to the collar-pad. 6 are the eyes through which the pin 7 is inserted. The compression-spring 8, when in position, is mounted on the pin 7, and has projecting ends 9, designed to rest upon the parts 5 and 11, as shown in Fig. VI. The cylinder 10 is formed upon one of the jointed parts, as shown in Fig. III, and is large enough to receive the coil-spring 8 without cramping or binding. An open longitudinal slot 12, Fig. III, or the closed slot 14, Fig. VII, is formed in the cylinder 10, through which one of the ends 9 of the spring 8 projects and serves as a stop, which absolutely prevents the destruction of the hook by expansion. (See Fig. I.)

The parts 5 and 11 may either or both be corrugated with the double crease, as at 13, Fig. VIII, or by a single crease, as at 13, Fig. X.

It will be observed that by longitudinally corrugating the parts 5 and 11 much strength and resisting power are acquired without increasing the size or weight of the parts—an important feature especially commendable for the shank 5.

The cylinder 10, inclosing the compression-spring, is a novel attainment in hooks for this use, for while it gives them a neat workmanlike appearance it guards the spring against anything that might otherwise come in contact with and destroy it.

The eyes 6 and cylinder 10 may be formed upon either the part 5 or 11, as may be most desirable.

One of the hooks is secured to each end of a horse-collar pad at or near its forward edge. The pad is then adjustably attached to the horse-collar by the well-known method of clasping the hook around the front roll thereof.

Having thus described my invention, what I claim, and desire to secure by Letters Patent, is—

The combination, with a horse-collar pad, of a jointed metal hook longitudinally corrugated, having at its joint a coil compression-spring incased in a cylinder provided with a slot to receive the end of the spring, the end of one jointed part being folded around a transverse metallic fastening-clip and thereby secured to the pad.

WILLIAM H. OSMER.

In presence of—
FERDINAND BURKART,
J. O. GOLDSMITH.